(12) United States Patent
Ku et al.

(10) Patent No.: US 11,897,172 B2
(45) Date of Patent: Feb. 13, 2024

(54) METHOD FOR FABRICATING POLAR PLATE OF FLEXIBLE PLASTIC GRAPHITE COMPOSITE

(71) Applicant: Institute of Nuclear Energy Research, Atomic Energy Council, Executive Yuan, R.O.C., Taoyuan (TW)

(72) Inventors: Hung-Hsien Ku, Taoyuan (TW); Ning-Yih Hsu, Taoyuan (TW); Han-Jou Lin, Taoyuan (TW); Tai-Feng Hung, Taoyuan (TW); Qiao-Ya Chen, Taoyuan (TW)

(73) Assignee: Institute of Nuclear Energy Research, Atomic Energy Council, Executive Yuan, R.O.C., Taoyuan (TW)

( * ) Notice: Subject to any disclaimer, the term of this patent is extended or adjusted under 35 U.S.C. 154(b) by 0 days.

(21) Appl. No.: 17/464,776

(22) Filed: Sep. 2, 2021

(65) Prior Publication Data
US 2023/0061762 A1 Mar. 2, 2023

(51) Int. Cl.
*B29C 43/00* (2006.01)
*B29C 43/24* (2006.01)
(Continued)

(52) U.S. Cl.
CPC ............ *B29C 43/006* (2013.01); *B29B 9/02* (2013.01); *B29C 43/003* (2013.01); *B29C 43/24* (2013.01);
(Continued)

(58) Field of Classification Search
CPC ..... B29C 43/006; B29C 43/003; B29C 43/24; B29C 43/46; B29C 43/52; D03D 15/275;
(Continued)

(56) References Cited

U.S. PATENT DOCUMENTS 4,180,623 A * 12/1979 Adams .................. H01M 10/36
429/70
6,242,124 B1 * 6/2001 Saito ..................... C04B 35/536
429/480
(Continued)

FOREIGN PATENT DOCUMENTS

JP         2010031214    * 10/2010
TW         201328008     *  7/2013  .............. H01M 4/96

*Primary Examiner* — Galen H Hauth
*Assistant Examiner* — Shibin Liang
(74) *Attorney, Agent, or Firm* — Jackson IPG PLLC; Demian K. Jackson

(57) ABSTRACT

A polar plate is fabricated. The polar plate is flexible and made of a plastic graphite composite. No matter a supporting member is used for calendering or not, a thin polar plate with controllable thickness is fabricated. The polar plate is excellent in blocking the through-transmission of vanadium ions and the limit of blending ratio of conductive carbon is broken through. The longitudinal through-transmission volume resistivity (proportional resistance to thickness) is greatly improved by adjusting the blending ratio of conductive carbon for meeting the demand of conductivity. In the mean time, the present invention strengthens the rigidity required for the thin polar plate while providing large-area polar plate fabrication for industrial use and convenience and provides a cooling and pressing method for patterning a composite polar plate. An integrated mold is thus obtained to replace the conventional polar plate which needs to be processed and prepared with runner.

6 Claims, 4 Drawing Sheets

(51) Int. Cl.
*B29B 9/02* (2006.01)
*B29C 43/52* (2006.01)
*B29C 43/46* (2006.01)
*C08K 3/04* (2006.01)
*D03D 15/275* (2021.01)
*D03D 15/25* (2021.01)
*H01M 8/18* (2006.01)
*C08K 7/06* (2006.01)
*B29K 101/10* (2006.01)
*B29K 101/12* (2006.01)

(52) U.S. Cl.
CPC .............. *B29C 43/46* (2013.01); *B29C 43/52* (2013.01); *C08K 3/04* (2013.01); *C08K 7/06* (2013.01); *D03D 15/25* (2021.01); *D03D 15/275* (2021.01); *H01M 8/188* (2013.01); *B29K 2101/10* (2013.01); *B29K 2101/12* (2013.01); *C08K 2201/001* (2013.01)

(58) Field of Classification Search
CPC . D03D 15/25; B29B 9/02; C08K 3/04; C08K 7/06; C08K 2201/001; H01M 8/188; H01M 8/02; B29K 2101/10; B29K 2101/12; B30B 15/34
See application file for complete search history.

(56) References Cited

U.S. PATENT DOCUMENTS

| | | | | |
|---|---|---|---|---|
| 2001/0049048 | A1* | 12/2001 | Kawahara | H01M 8/1004 429/492 |
| 2006/0024562 | A1* | 2/2006 | Kashino | H01M 4/8605 429/506 |
| 2008/0299419 | A1* | 12/2008 | Zhamu | H01M 8/0213 977/734 |
| 2013/0237404 | A1* | 9/2013 | Lee | B82Y 30/00 501/153 |
| 2014/0217332 | A1* | 8/2014 | Simmons | B32B 17/04 264/105 |
| 2015/0090922 | A1* | 4/2015 | Hatakeyama | B29C 43/24 252/74 |
| 2016/0064741 | A1* | 3/2016 | Kumaraguru | H01M 8/1004 427/115 |
| 2020/0208341 | A1* | 7/2020 | Yoshimura | D06M 11/74 |

* cited by examiner (a)

(b)

METHOD FOR FABRICATING POLAR PLATE OF FLEXIBLE PLASTIC GRAPHITE COMPOSITE

TECHNICAL FIELD OF THE INVENTION

The present invention relates to fabricating a plastic polar plate; more particularly, to fabricating a thin polar plate with controllable thickness no matter a supporting member is used for calendering or not, where there is no limit on the blending ratio of conductive carbon for powder; an excellent function of blocking the through-transmission of vanadium ions is obtained; and the longitudinal through-transmission volume resistivity (proportional resistance to thickness) is greatly improved for meeting the demand of conductivity.

DESCRIPTION OF THE RELATED ARTS

With the development of solar power generation and new energy technology, the demand for electricity storage increases in market. The development of solar energy, electric vehicle, and new energy all require technical support of energy storage. Energy storage is regarded as the rising star for energy industry in the future.

At present, the thin-film polar plates proposed in related prior arts have restrictions on the blending ratio of conductive carbon. With the consideration for forming film, only a relatively small amount of powder is applied.

Currently, there is still considerable room for the development. Because the plate plays a very important role in flow battery, the ratio of performance to price can be significantly expressed if an easy method can be found to greatly improve the efficiency of battery. The rigidity of the thin-film polar plate needs to be strengthened. A large-area polar plate needs to be fabricated for industrial use and convenience. Hence, the prior arts do not fulfill all users' requests on actual use.

SUMMARY OF THE INVENTION

The main purpose of the present invention is to fabricate a thin polar plate with controllable thickness no matter a supporting member is used for calendering or not, where the polar plate is excellent in blocking the through-transmission of vanadium ions and the limit of blending ratio of conductive carbon is broken through; and the longitudinal through-transmission volume resistivity (proportional resistance to thickness) is greatly improved by adjusting the blending ratio of conductive carbon for meeting the demand of conductivity.

Another purpose of the present invention is to strengthen the rigidity required for the thin polar plate, where a large-area polar plate is fabricated for industrial use and convenience.

Another purpose of the present invention is to provide a cooling and pressing method for patterning a composite polar plate, where an integrated mold is obtained to replace the conventional polar plate which needs to be processed and prepared with runner.

To achieve the above purposes, the present invention is a method for fabricating a polar plate of a flexible plastic graphite composite, comprising steps of: (a) providing 500~1100 parts per hundred rubber (phr) of a conductive powder composition with high carbon (>98%) and low ash (<1%) to be ball-milled at least 0.5 hours (hr) at a speed of at least 200 rounds per minute (rpm) to form a conductive powder; (b) providing a total of 100 phr of a thermoplastic/thermosetting resin adhesive composition to mix the thermoplastic/thermosetting resin adhesive composition and the conductive powder with a solvent by stirring at least 1 hr to form a mixture; (c) after directly and repeatedly calendering the mixture into a plastic sheet with rigidity by rolling/squeezing, obtaining a requested thickness of the plastic sheet; (d) depositing the plastic sheet under a temperature higher than the boiling point of the solvent for 20~50 degrees Celsius (° C.) to process volatilization under a normal pressure or a low-temperature vacuum to remove the solvent; (e) (e1) directly forming an unsupported plastic plate from the plastic sheet; or (e2) repeatedly calendering the plastic sheet to a requested thickness with at least one supporting member stacked into an upper layer together with a lower layer or a plurality of overlapping layers to obtain at least one layer of a plastic composite plate having supporting member; and (f) according to a requested graph, graphic-shaping the plastic plate with required heat and pressure provided on forming the requested graph to obtain a finished plate. Accordingly, a novel method for fabricating a polar plate of a flexible plastic graphite composite is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Please refer to FIG. 1 to FIG. 4, which are a flow view showing a preferred embodiment according to the present invention; a view showing the structure of a non-supported plastic plate; a view showing the structure of a plastic composite plate; and a view showing the graphic-shaping of a polar plate. As shown in the figures, the present invention is a method for fabricating a polar plate of a flexible plastic graphite composite, comprising the following steps:

(a) Ball-milling conductive powder s11: 500~1100 parts per hundred rubber (phr) of a conductive powder composition with high carbon (>98%) and low ash (<1%) is provided to be ball-milled at least 0.5 hours (hr) at a speed of at least 200 rounds per minute (rpm) for forming a conductive powder.

(b) Mixing through homogeneous stirring s12: A total of 100 phr of a thermoplastic/thermosetting resin adhesive composition is provided to mix the thermoplastic/thermosetting resin adhesive composition and the conductive powder with a solvent by stirring at least 1 hr for forming a mixture, where the thermoplastic/thermosetting resin adhesive composition is a thermoplastic resin, a thermosetting resin, or a combination of the thermoplastic resin and the thermosetting resin.

(c) Calendering to form sheet s13: After directly and repeatedly calendering the mixture into a plastic sheet 1 with rigidity by rolling/squeezing, a requested thickness is obtained.

(d) Removing solvent s14: The plastic sheet 1 is deposited under a temperature higher than the boiling point of the solvent for 2050 degrees Celsius (° C.) to process volatilization under a normal pressure or a low-temperature vacuum to remove the solvent.

Figure 1:
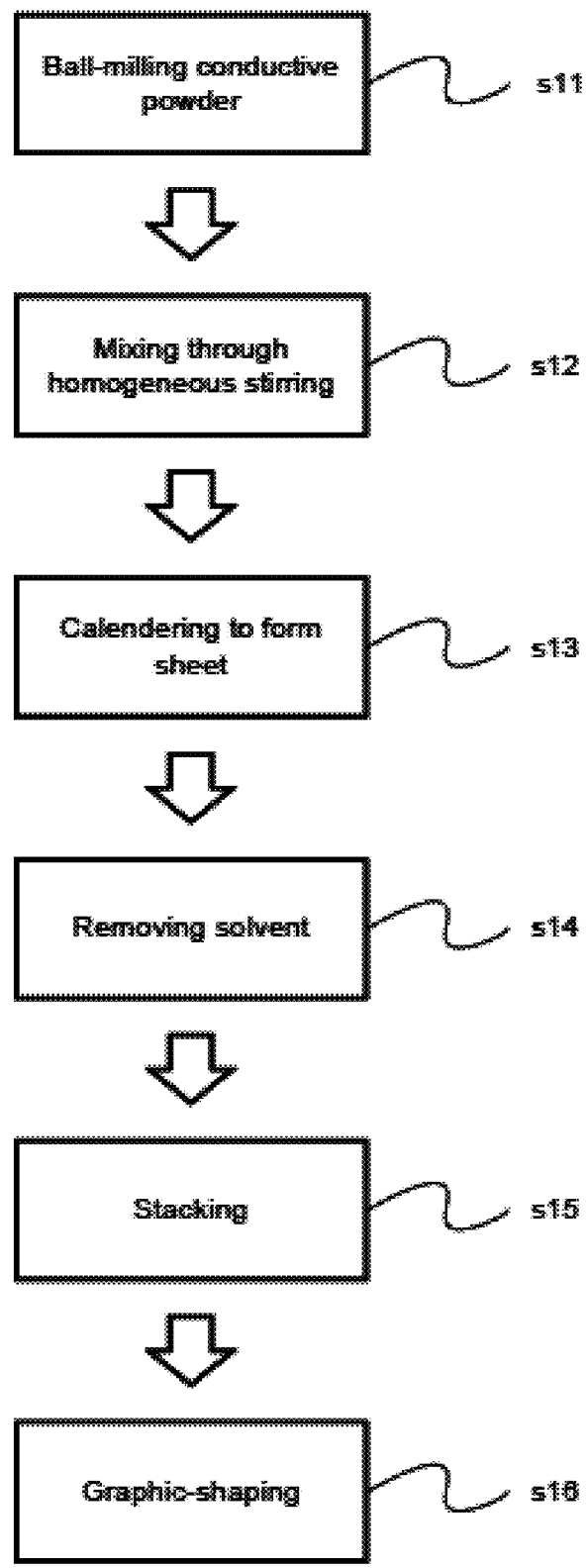
FIG. 1 is the flow view showing the preferred embodiment according to the present invention.
Figure 2:
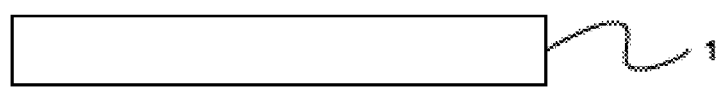
FIG. 2 is the view showing the structure of the non-supported plastic plate.
Figure 3:
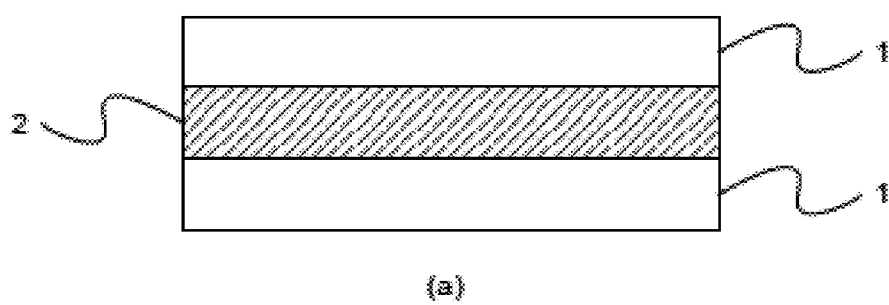
FIG. 3 is the view showing the structure of the plastic composite plate.
Figure 3:
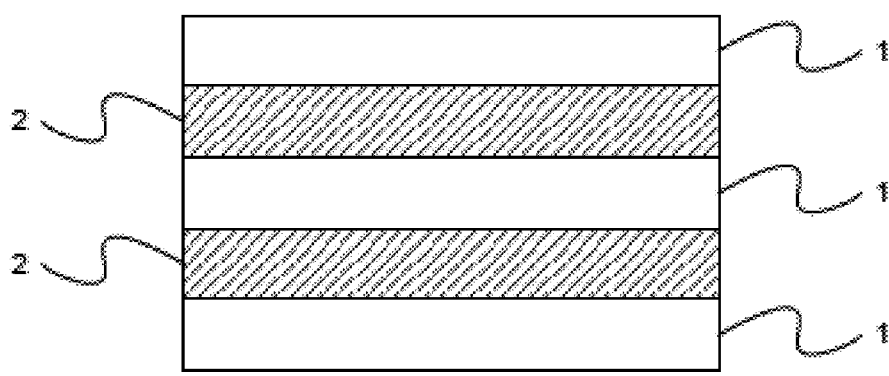

(e) Stacking: (e1) An unsupported plastic plate 10 is directly formed from the plastic sheet 1, whose structure is shown in FIG. 2; or (e2) the plastic sheet 1 is repeatedly calendered to a requested thickness with at least one supporting member 2 stacked into an upper layer together with a lower layer or a plurality of overlapping layers to form at least one layer of a plastic composite plate having supporting member(s) 2, whose structure is shown in FIG. 3 with diagram (a) showing a single-layer-supported plastic composite plate 20 and diagram (b) showing a multi-layer-supported plastic composite plate 30.

Figure 4:
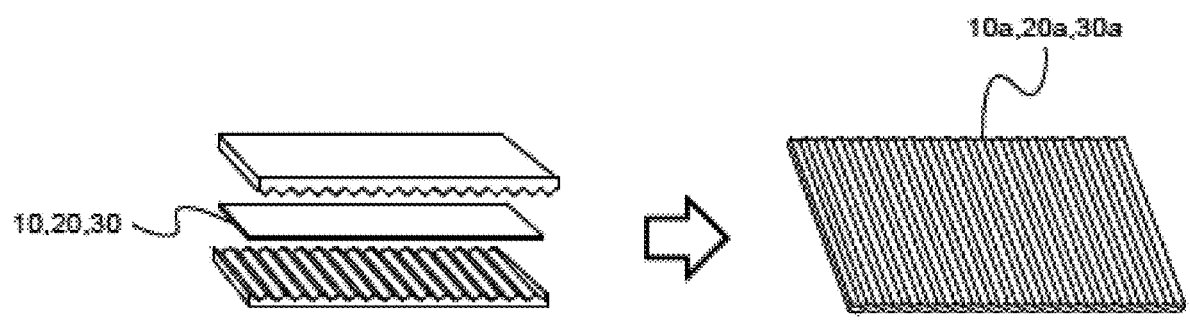
FIG. 4 is the view showing the graphic-shaping of the polar plate.

(f) Graphic-shaping s16: According to a requested graph, the unsupported plastic plate 10 or the single-layer- or multi-layer-supported plastic composite plate 20, 30 is graphic-shaped with required heat and pressure provided on forming the requested graph to obtain a finished plate 10a, 20a, 30a as shown in FIG. 4, where the pressure is a gauge pressure greater than 20 kilograms-force per square centimeter (kgf/cm$^2$) and the finished plate 10a, 20a, 30a has a volume resistivity at Z-axis not greater than $10^{-1}$ ohm meters.

Thus, a novel method for fabricating a polar plate of a flexible plastic graphite composite is obtained.

In a state-of-use, the conductive powder composition further comprises less than 5 weight percent (wt %) of a flame retardant.

In a state-of-use, the thermoplastic/thermosetting resin adhesive composition is a halogen crystalline resin, a halogen non-crystalline resin, a non-halogen crystalline resin, or a non-halogen non-crystalline resin; and has a heat deflection temperature (HDT) of 50~300° C.

In a state-of-use, the supporting member is a conductive carbon fabric of carbon fiber bundles with each bundle consisting at least 12,000 monofilaments; a metal with a three-dimensional hollow, such as a foamed nickel; or a conductive woven fabric, which is made of iron or graphite.

In a state-of-use, the rolling/squeezing has a F-style, Z-style, S-style, or L-style.

In a state-of-use, the graph is at least one line continuously extending and the line is a straight line, a wavy curve (as shown in FIG. 4), a regular line, or an irregular line.

Hence, no matter a supporting member is used for calendering or not, a polar plate with controllable thickness is fabricated. The polar plate is excellent in blocking the through-transmission of vanadium ions and the limit of blending ratio of conductive carbon is broken through. The longitudinal through-transmission volume resistivity (proportional resistance to thickness) is greatly improved by adjusting the blending ratio of conductive carbon for meeting the demand of conductivity. In the mean time, the present invention strengthens the rigidity required for the polar plate for providing large-area polar plate fabrication for industrial use and convenience, and provides a cooling and pressing method for patterning a composite polar plate. An integrated mold is thus obtained to replace the conventional polar plate which needs to be processed and prepared with runner.

To sum up, the present invention is a method for fabricating a polar plate of a flexible plastic graphite composite, whereno matter a supporting member is used for calendering or not, a polar plate with controllable thickness is fabricated; the polar plate is excellent in blocking the through-transmission of vanadium ions and the limit of blending ratio of conductive carbon is broken through; and the longitudinal through-transmission volume resistivity is greatly improved by adjusting the blending ratio of conductive carbon (proportional resistance to thickness) for meeting the demand of conductivity.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method for fabricating a polar plate of a plastic graphite composite comprising steps of:
    (a) ball-milling a conductive powder composition with high carbon (>98%), less than 5 weight percent (wt %) of a flame retardant, and low ash (<1%) for at least 0.5 hours (hr) at a speed of at least 200 rounds per minute (rpm) to form a conductive powder;
    (b) mixing the conductive powder, a thermoplastic/thermosetting resin adhesive composition, and a solvent by stirring at least 1 hr to form a mixture;
    (c) directly and repeatedly calendering said mixture into a rigid plastic sheet by rolling/squeezing and obtaining a requested thickness of said plastic sheet;
    (d) depositing said plastic sheet to process volatilization under a low-temperature vacuum to remove said solvent;
    (e) obtaining a composite plastic plate through repeatedly calendering said plastic sheet to a requested thickness with at least one conductive woven iron fabric supporting member stacked into layers consisting of an upper layer of the plastic sheet together with a lower layer of the plastic sheet and a plurality of overlapping layers of the plastic sheet alternating with the conductive woven iron fabric support members to obtain at least one layer of a plastic composite plate having the plastic sheets and the at least one woven iron fabric supporting member; and
    (f) graphic-shaping said plastic composite plate with required heat and pressure according to a requested graph to obtain a finished shaped plate.

2. The method according to claim 1, wherein said thermoplastic/thermosetting resin adhesive composition is selected from a group consisting of a thermoplastic resin, a thermosetting resin, and a combination of said thermoplastic resin and said thermosetting resin.

3. The method according to claim 2, wherein said thermoplastic/thermosetting resin adhesive composition is selected from a group consisting of a halogen crystalline resin, a halogen non-crystalline resin, a non-halogen crystalline resin, and a non-halogen non-crystalline resin.

4. The method according to claim 1, wherein said graph is at least one line continuously extending and said line is selected from a group consisting of a straight line, a wavy curve, a regular line, and an irregular line.

5. The method according to claim 1, wherein, in step (f), said pressure is a gauge pressure greater than 20 kilograms-force per square centimeter (kgf/cm$^2$).

6. The method according to claim 1, wherein said finished plate has a volume resistivity at Z-axis not greater than $10^{-1}$ ohm-meters.

* * * * *